E. B. LENNIG.
THERMOSTAT PLUG.
APPLICATION FILED AUG. 15, 1917.
1,436,267.
Patented Nov. 21, 1922.
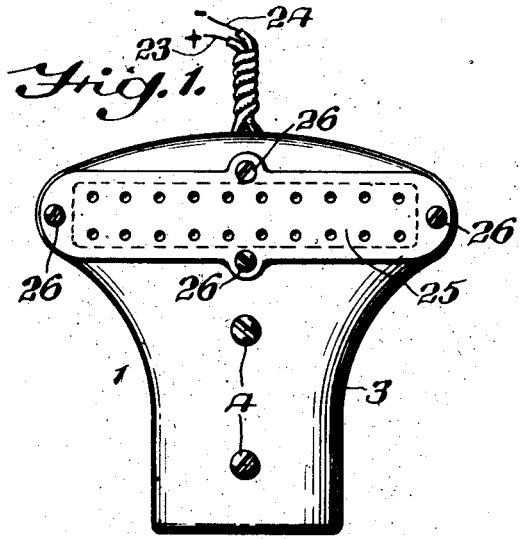
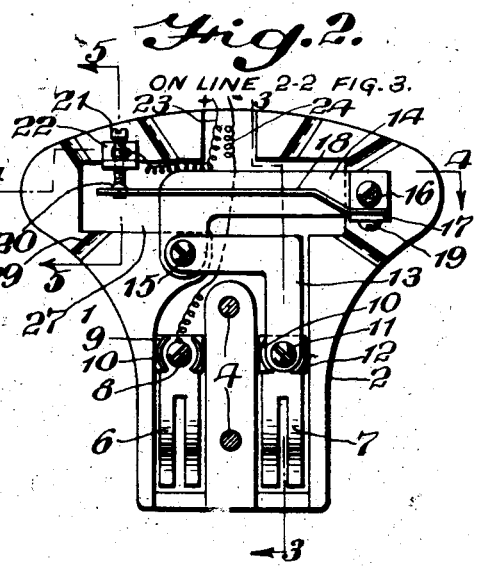
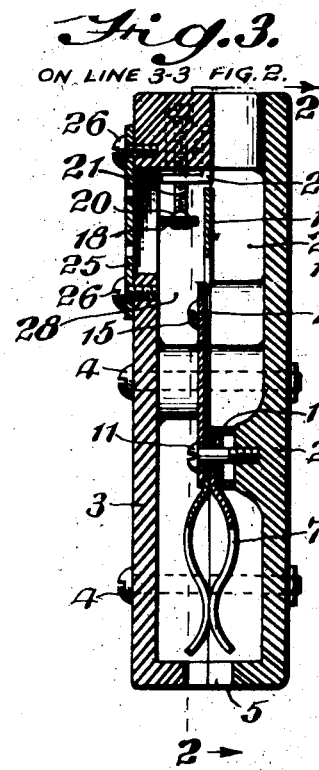
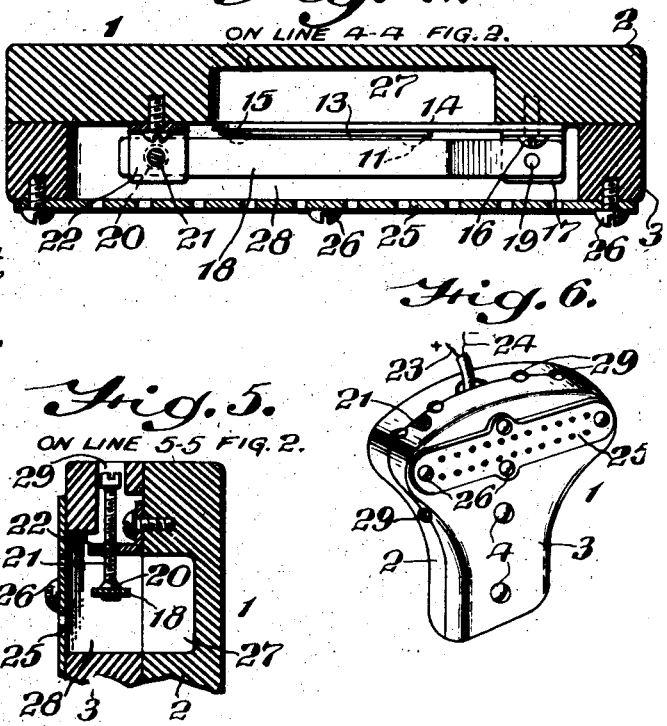
INVENTOR
Edmund B. Lennig.
BY Iedersheim Fairbanks
ATTORNEYS Patented Nov. 21, 1922.

1,436,267

UNITED STATES PATENT OFFICE.

EDMUND B. LENNIG, OF SAN FRANCISCO, CALIFORNIA, ASSIGNOR, BY MESNE ASSIGNMENTS, TO ELECTRIC RADIATOR & ENGINEERING CO. INC., OF SAN FRANCISCO, CALIFORNIA, A CORPORATION OF CALIFORNIA.

THERMOSTAT PLUG.

Application filed August 15, 1917. Serial No. 186,344.

*To all whom it may concern:*

Be it known that I, EDMUND B. LENNIG, a citizen of the United States, residing in the city and county of San Francisco, State of California, have invented a new and useful Thermostat Plug, of which the following is a specification.

My present invention consists of a novel thermostatic device which is preferably constructed in the form of a plug in order to enable it to be readily connected with any electrical device which is to be regulated.

It further consists of a novel thermostat, wherein the thermostat blade is formed by annealing together two metal bodies of different mass and alloy to form a concrete unit, and novel means are provided to mount the thermostat plate and to support the fixed contact which is adjustably mounted with respect to the movable contact carried by the thermostat blade.

With the above in view, my invention, in its broad and generic scope, consists of a thermostat plug adapted to be connected to a source of electrical energy so as to automatically control the electrical devices which are in electrical and thermal connection with such thermostat.

It further consists of a novel manner and means of mounting and arranging the thermostat blade and its adjuncts, so that upon a predetermined increase in the temperature, the circuit to which the thermostat plug is connected will be open.

Other novel features of construction and advantage will hereinafter appear in the detailed description of my invention.

For the purpose of illustrating my invention, I have shown in the accompanying drawings, a typical embodiment of it which is at present preferred by me, since this embodiment will give in practice satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a rear elevation of a thermostat plug embodying my invention.

Figure 2 represents a sectional view, taken on line 2—2 of Figure 3,

Figure 3 represents a section on line 3—3 of Figure 2.

Figure 4 represents a section on line 4—4 of Figure 2.

Figure 5 represents a section on line 5—5 of Figure 2.

Figure 6 represents a perspective view of a thermostat plug embodying my invention.

Similar numerals of reference indicate corresponding parts.

Referring to the drawings:—

1 designates a thermostat embodying my invention, which is formed of two sections of insulating material 2 and 3, respectively, which are connected together by means of fastening devices 4 of any desired type. These sections are chambered or hollowed out in any desired manner in order to receive the various elements of the thermostatic control. The sections of the plug when united form an aperture 5 through which is adapted to be inserted the terminals of an electric iron or other electrical device employing a plug to electrically connect such device with a source of electric energy.

6 and 7 designate clips to receive the terminals of the electric device to which the plug is to be connected. These clips may be of any desired or conventional construction, and in the form shown the members of the clips 6, for example, are mounted on a section by means of a screw 8, which passes through the clips and through a metal post 9 and into the section 2. The post 9 has its ends upwardly deflected, as indicated at 10, see Figure 2. The terminal 7 is secured in a similar manner by means of the fastening device 11 and the post 12, and the fastening device 11 also secures in position an arm 13 of angle formation, which is connected to the base plate 14 also, preferably of angle formation and secured in position by means of the fastening devices 15 and 16.

Secured to or integral with the base plate 14 is a post 17 to which is secured a thermostat blade 18 by means of a fastening device 19. The thermostat blade 18 is formed of a plurality of metal bodies of different mass and alloy and different coefficients of expansion, said bodies being annealed together. This thermostatic blade is fixed at one end by means of the fastening device 19 and its opposite end is free and is provided with a contact 20, which normally engages the movable contact 21 which consists of a screw adjustable in a post 22 secured in any desired manner to the casing section 2.

23 designates an electrical conductor connected with the post 22 and 24 designates the other electrical conductor which is connected with the fastening device 8 of the clip 6. A portion of the side wall of the section 3 of the plug is cut away and the opening thus formed is covered by an apertured plate 25 which is secured in position by means of fastening devices 26 engaging the casing section 3. The chambers 27 and 28 formed by the plug sections 2 and 3 are in communication with the atmosphere through the apertures 29, the number and location of which may vary in accordance with requirements and conditions met with in practice. These spaces provide for an air current for conveying warm air from the electric device to act upon the thermostat blade 18.

In the operation, the circuit is normally closed, but when the temperature of the iron, for example, increases to the predetermined point, the thermostat blade 18 will move away from the movable contact 21 and the circuit will be opened.

Owing to the provision of the adjustable contact member 21, the device may be readily regulated so that the circuit will be opened and will close at any desired degrees of temperature.

It will be seen that the thermostat blade is mounted on a metal strip so that the sudden changes of temperature will be quickly distributed to act on the thermostat blade and the insulating material of the plug is provided with air passages so that the proper circulation of air within the plug is effected.

It will be seen that one section of the plug forms a base or support on which the thermostat and its adjuncts is mounted and the other section of the plug forms a cover to conceal the mechanism of the plug.

It will now be apparent that I have devised a new and useful thermostat plug, which embodies the features of advantage enumerated as desirable in the statement of the invention and the above description, and while I have, in the present instance, shown and described a typical embodiment of it which will give in practice satisfactory and reliable results, it is to be understood that this embodiment is susceptible of modification in various particulars without departing from the spirit or scope of the invention or sacrificing any of its advantages.

Having thus described my invention, what I claim as new and desire to secure by Letters Patent, is:—

A thermostatic device of the character described, which is adapted to open and close a circuit, comprising a base of insulating material, a cover of insulating material forming a plug, a thermostat blade, composed of two metal strips of different mass and composition, an adjustable contact, said thermostat blade being securely held in position on said base and having its operative portion extending to the adjustable contact and normally held in contact therewith, means to secure fixedly said adjustable contact against movement in respect to said base, said plug having a series of air passages in its insulating material for conveying changes of air to the thermostat blade, and said cover having an opening therein in proximity to said blade, a perforated plate closing said opening, and a metal strip for conducting heat to said thermostat blade.

EDMUND B. LENNIG.

Witnesses:
Geo. Peck,
Geo. J. Coates.